(12) United States Patent
Yahagi (10) Patent No.: US 8,399,785 B2
(45) Date of Patent: Mar. 19, 2013

(54) ELECTRONIC APPARATUS

(75) Inventor: Hiroaki Yahagi, Tokyo (JP)

(73) Assignee: Nihon Kohden Corporation, Tokyo (JP)

( * ) Notice: Subject to any disclaimer, the term of this patent is extended or adjusted under 35 U.S.C. 154(b) by 267 days.

(21) Appl. No.: 12/880,243

(22) Filed: Sep. 13, 2010

(65) Prior Publication Data

US 2011/0214971 A1    Sep. 8, 2011

(30) Foreign Application Priority Data

Sep. 14, 2009    (JP) .................................. 2009-212442

(51) Int. Cl.
*H01H 9/20*    (2006.01)
(52) U.S. Cl. ................. 200/50.18; 200/50.14; 200/52 R
(58) Field of Classification Search ............... 200/17 R, 200/50.01, 50.1, 50.14, 50.28, 50.31, 43.01, 200/51 R, 51.09, 51.11, 51.12, 51.14, 51.16, 200/52 R, 61.58 R, 61.62, 61.71–61.78, 293, 200/303, 329, 330, 333, 60; 439/152, 153, 439/155, 157, 159, 160, 166, 171, 173, 500, 439/625–627; 429/96–100; 604/151; 607/33, 607/37, 60, 61, 145, 150, 151
See application file for complete search history.

(56) References Cited

U.S. PATENT DOCUMENTS

| | | | | |
|---|---|---|---|---|
| 3,071,747 | A | * | 1/1963 | Moore ........................... 338/179 |
| 3,863,062 | A | * | 1/1975 | Caron ........................... 362/116 |
| 4,384,180 | A | * | 5/1983 | Meijer et al. ................. 200/52 R |
| 4,636,596 | A | * | 1/1987 | Takada .......................... 200/52 R |
| 5,038,017 | A | * | 8/1991 | Slenker ......................... 219/211 |
| 5,097,384 | A | * | 3/1992 | Sunano .................... 361/679.31 |
| 5,248,570 | A | * | 9/1993 | Meier ............................. 429/121 |
| 5,634,815 | A | * | 6/1997 | Inazuka et al. ................ 439/500 |
| 6,612,715 | B1 | * | 9/2003 | Shiau ............................ 362/204 |

FOREIGN PATENT DOCUMENTS

| | | |
|---|---|---|
| EP | 2 099 112 A2 | 9/2009 |
| JP | 56 056099 A | 5/1981 |
| JP | 5-225140 A | 9/1993 |
| JP | 3030636 U | 8/1996 |
| JP | 2000-223093 A | 8/2000 |
| JP | 2007000445 A | 1/2007 |

OTHER PUBLICATIONS

Japanese Office Action for related Japanese Patent Application No. 2009-212442 dated Feb. 10, 2012.
Extended European Search Report Mar. 24, 2011.

* cited by examiner

*Primary Examiner* — Michael Friedhofer
(74) *Attorney, Agent, or Firm* — Kenealy Vaidya LLP (57) ABSTRACT

An electronic apparatus includes: an apparatus body which can house a battery; a lid member which is coupled to the apparatus body; an operating portion which is moved between an ON position where a power source supplied from the battery is turned ON, and an OFF position where the power source is turned OFF; and a unit which, when the operating portion is not at a position which is one of the ON position and the OFF position, moves the operating portion to the position and holds the operating portion at the position in accordance with removal or coupling of the lid member from or to the apparatus body.

10 Claims, 12 Drawing Sheets

ELECTRONIC APPARATUS

BACKGROUND OF THE INVENTION

The present invention relates to an electronic apparatus which obtains electric power from a battery to operate, and more particularly to an electronic apparatus in which the power source is assured to be turned ON (or OFF) after replacement of a battery.

For example, a medical telemetry apparatus is always carried with the patient, and operates so as to obtain and transmit biological information. When the apparatus is carried with the patient, the apparatus is basically used in a state where the power source is turned ON. When battery replacement is to be performed, the apparatus is handled in the following manner. A medical person or the like opens the lid of the apparatus, replaces a battery with a fresh one, closes the lid, and the power source is again turned ON so that the measurement is continued.

In a related-art medical telemetry apparatus, therefore, the power source must be usually in the ON state after replacement of a battery. In the case where the power source is turned OFF when battery replacement is to be performed, the operation is cumbersome, thereby causing a problem in that the work efficiency is poor. Furthermore, a situation where a medical person forgets to turn ON the power source may occur.

To comply with this, a technique in which a power source switch is eliminated and the ON/OFF state of the power source is switched by battery replacement may be contemplated. In the technique, also in the case where the apparatus is not used, however, the power source is turned ON, and the battery is consumed. Therefore, the elimination of a power source switch causes a new problem.

By contrast, there is an apparatus having a configuration in which a battery replacement switch is exposed in a state where a lid of a battery housing portion is opened. The apparatus is configured so that, after battery replacement, the battery replacement switch is automatically set to a predetermined state in accordance with an attaching/detaching operation of the lid (JP-A-5-225140, particularly FIGS. 6 to 9 and corresponding description).

However, the apparatus is not configured so that the operator can move an operating portion for the power source from the ON position to the OFF position. Therefore, the apparatus does not have a configuration where the power source of the apparatus is turned ON or OFF by changing the position of the operating portion which is obtained before battery replacement.

SUMMARY

It is therefore an object of the invention to provide an electronic apparatus in which the power source can be turned ON or OFF by an operation of attaching or detaching a lid member in batter replacement, and, in a necessary case, by changing the position of an operating portion before battery replacement.

In order to achieve the object, according to the invention, there is provided an electronic apparatus comprising: an apparatus body which can house a battery; a lid member which is coupled to the apparatus body; an operating portion which is moved between an ON position where a power source supplied from the battery is turned ON, and an OFF position where the power source is turned OFF; and a unit which, when the operating portion is not at a position which is one of the ON position and the OFF position, moves the operating portion to the position and holds the operating portion at the position in accordance with removal or coupling of the lid member from or to the apparatus body.

The electronic apparatus may further include a switch contact which is disposed in a supply path for the power source, and which closes and opens the supply path. The operating portion may be moved between the ON position and the OFF position to move the switch contact, thereby closing or opening the supply path.

The unit may continue to hold the operating portion irrespective of an operation of coupling the lid member to the apparatus body.

The position may be the ON position.

The lid member may be removed from or coupled to the apparatus body by a swinging or sliding operation.

The operating portion may be moved between the ON position and the OFF position along an arcuate groove.

The operating portion may be moved from the OFF position to the ON position by being pressed toward the lid member.

The operating portion may be disposed in the lid member.

The electronic apparatus may further include a biological signal measuring portion which can measure a biological signal.

According to the invention, there is also provided an electronic apparatus comprising: an apparatus body which can house a battery; a lid member which is removably coupled to the apparatus body; an operating portion which is moved between an ON position where a power source supplied from the battery is turned ON, and an OFF position where the power source is turned OFF; and a unit which, when the operating portion is at a first position which is one of the ON position and the OFF position, moves the operating portion to a second position which is the other of the ON position and the OFF position and holds the operating portion at the second position in accordance with removal of the lid member from the apparatus body, the unit which, when the operating portion is at the second position, holds the operating portion at the second portion in accordance with removal of the lid member from the apparatus body.

BRIEF DESCRIPTION OF THE DRAWINGS

FIGS. 3(*a*) and 3(*b*) are bottom views of the medical telemeter which is the first embodiment of the electronic apparatus of the invention, FIG. 3(*a*) shows a state where a lid member is closed, and FIG. 3(*b*) shows a process of opening the lid member.

DETAILED DESCRIPTION OF EMBODIMENTS

Figure 1:
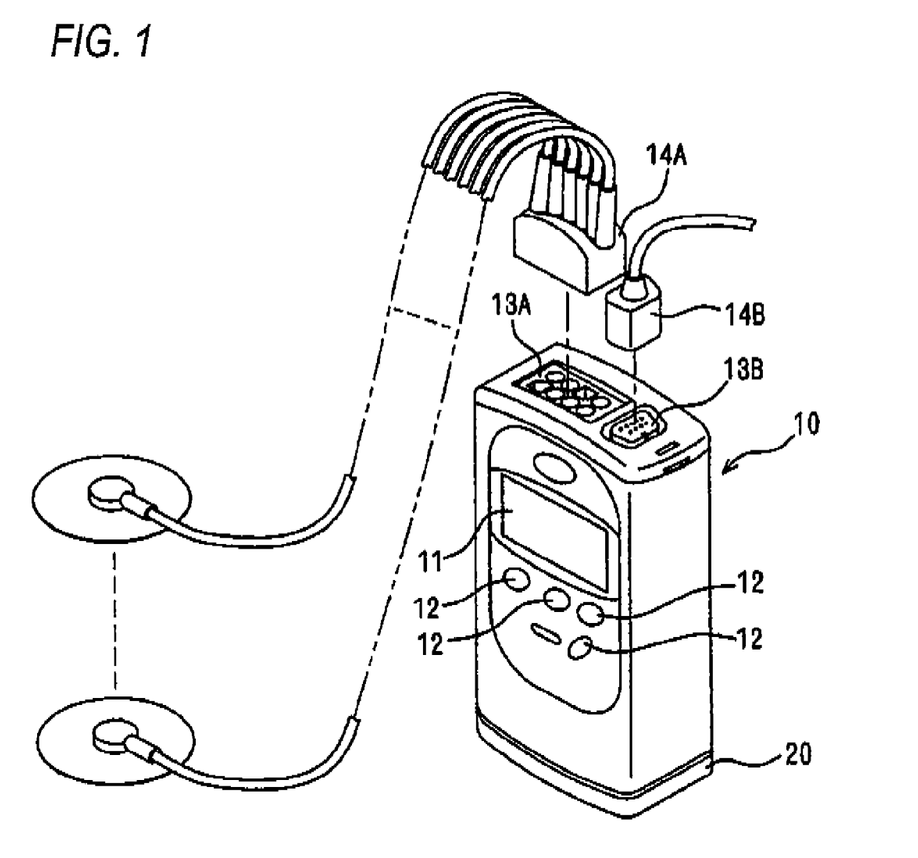
FIG. 1 is a perspective view showing a medical telemeter which is a first embodiment of the electronic apparatus of the invention.

Hereinafter, embodiments of the electronic apparatus of the invention will be described with reference to the accompanying drawings. In figures, identical components are denoted by the same reference numerals, and duplicate description will be omitted. The electronic apparatus of a first embodiment is a medical telemeter, and, as shown in FIG. 1, includes the apparatus body 10 which has an oblong rectangular parallelepiped shape. A displaying portion 11 which includes an LCD and on which the measurement state, the battery level, and the like are displayed, and operation buttons 12 for performing settings which are required in measurement are disposed in one face of the apparatus body 10.

Receptacles 13A, 13B respectively constituting connectors are disposed in the upper face of the apparatus body 10 in the state where the apparatus body 10 is erected, so that plugs 14A, 14B which constitute other connectors can be connected thereto, respectively. For example, electrodes for an ECG are connected to the plug 14A, and a sensor for measuring an SpO2 is connected to the plug 14B.

Figure 2:
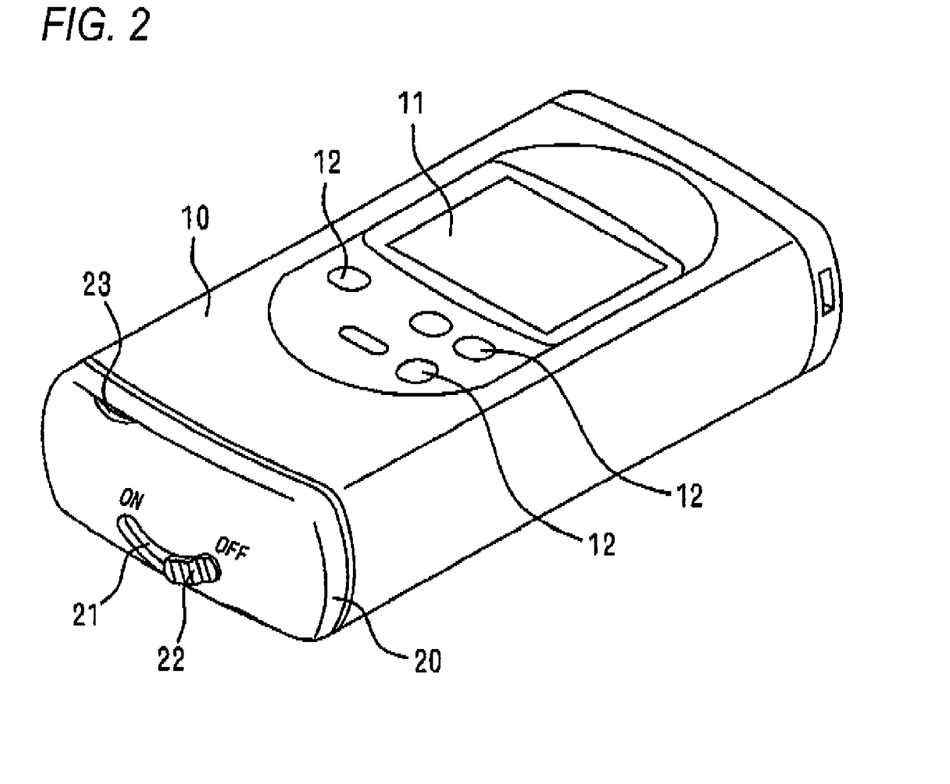
FIG. 2 is a perspective view showing the medical telemeter which is the first embodiment of the electronic apparatus of the invention.

A bottom portion the apparatus body 10 in the state where the apparatus body 10 is erected is formed as a lid member 20, and the apparatus body 10 and the lid member 20 are coupled to each other. As shown in FIG. 2, an arcuate groove 21 is formed in a bottom face side of the lid member 20, and an operating portion 22 of a switch is inserted through the groove 21 so that the operating portion 22 can be slid between an ON position and an OFF position.

Figure 3:
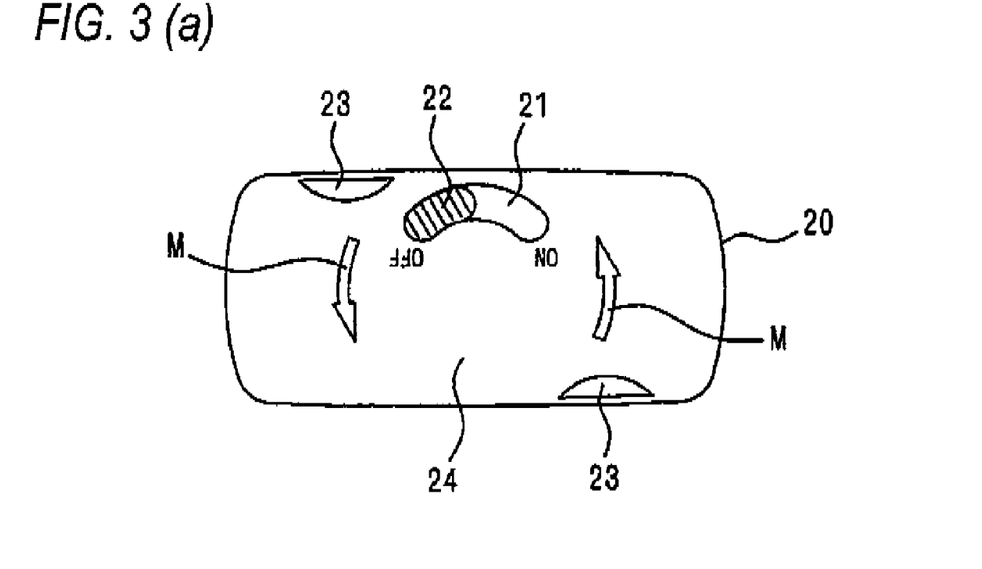

A crescent recess 23 functioning as a finger hold against which a finger tip or the like butts in the case where the lid member 20 is to be removed from the apparatus body 10 is formed in the bottom face of the lid member 20. As shown in FIG. 3(b), an outer lid 24 of the lid member 20 can be swung in a counterclockwise direction from the coupled position shown in FIG. 3(a). A face which is a part of an inner lid bottom plate 25 appears as a result the swinging of the outer lid 24. The arrows M are marks which are formed by cutting in order to indicate the swinging direction in the case of removal.

Figure 4:
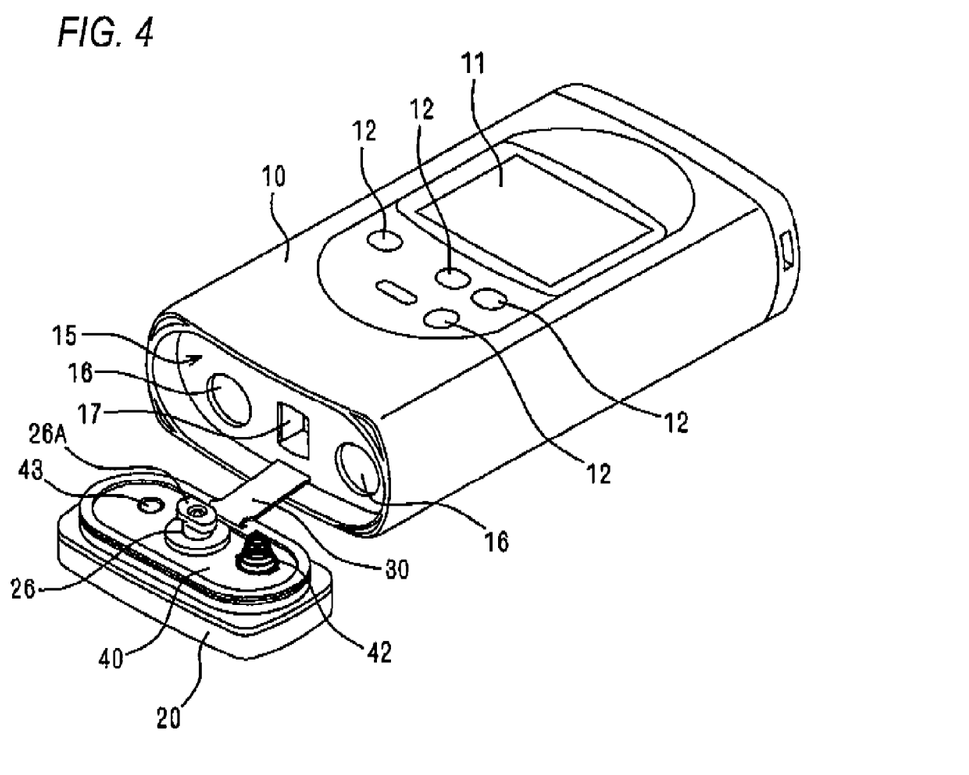
FIG. 4 is a perspective view of a state where the lid member of the medical telemeter which is the first embodiment of the electronic apparatus of the invention is opened.

When the outer lid 24 is pulled so as to be separated from the apparatus body 10 in the state of FIG. 3(b), the inner lid bottom plate 25 is detached from a bottom portion of the apparatus body 10, and a bottom face recess 15 appears as shown in FIG. 4. FIG. 4 shows a state where the outer lid 24 and the inner lid bottom plate 25 overlap with each other. Actually, the inner lid bottom plate 25 is separated from the apparatus body 10 in the state of FIG. 3(b). Openings of housing portions 16 which respectively house batteries for supplying electric power to an internal electronic circuit are formed in the bottom face recess 15 of the apparatus body 10. An opening of a housing portion 17 which houses the head 26A of an engaging piece 26 disposed in the lid member 20 is formed between the two housing portions 16. An engaging portion (not shown) which, when the head 26A of the engaging piece 26 is swung, engages with the head 26A to cause the lid member 20 and the apparatus body 10 to be coupled and fixed to each other is disposed in the housing portion 17. The lid member 20 and the apparatus body 10 are connected to each other by a string member 30 having an appropriate length, so that, when the lid member 20 is removed, the lid member 20 is prevented from being lost.

Figure 5:
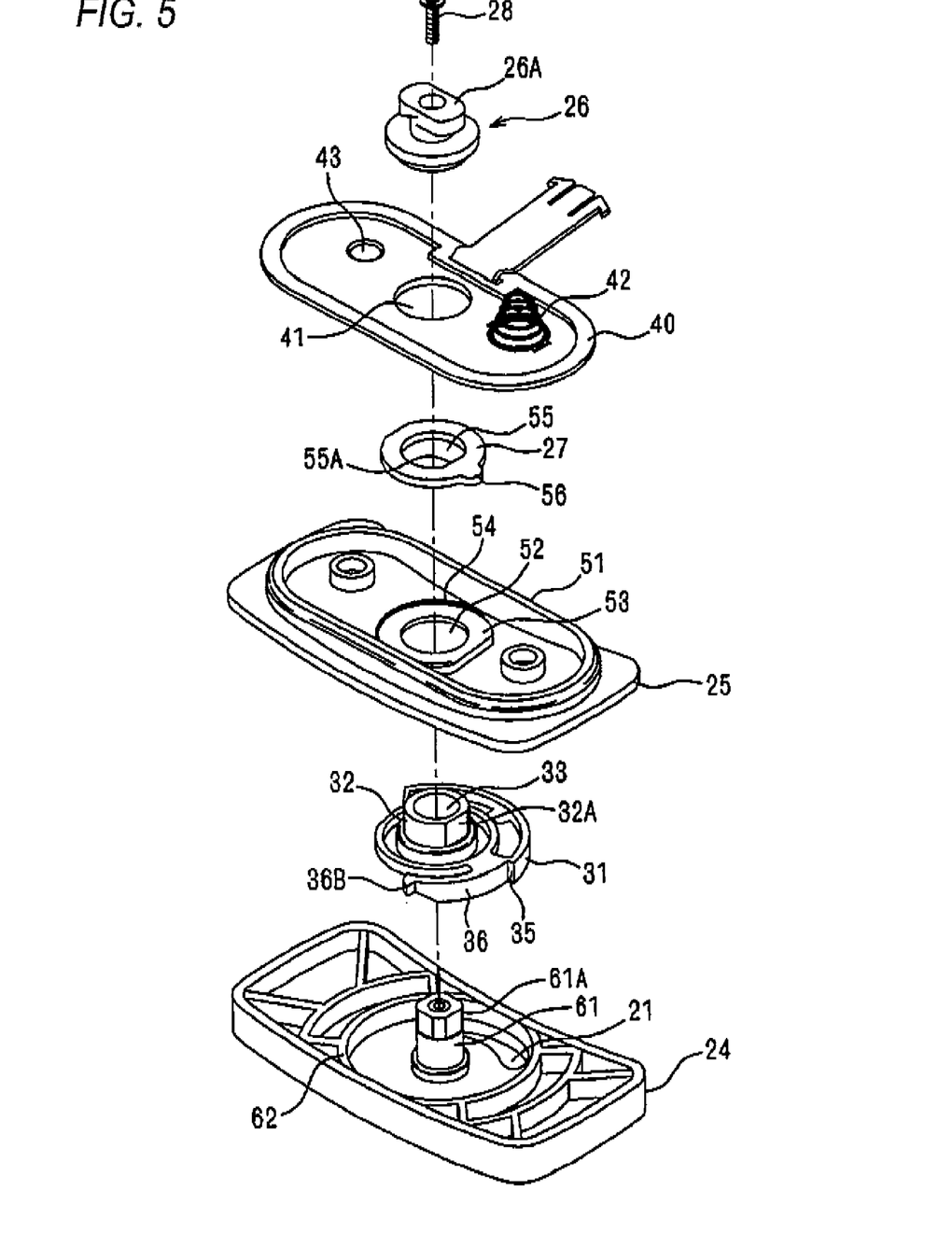
FIG. 5 is an assembly perspective view of the lid member in the medical telemeter which is the first embodiment of the electronic apparatus of the invention.

FIG. 5 is an assembly perspective view of the lid member 20. The lid member 20 includes the outer lid 24, a rotary member 31, the inner lid bottom plate 25, a ring 27, an inner lid top plate 40, and the engaging piece 26. In FIG. 5, these components are drawn in the direction from the lower side to the upper side. These components are assembled into the lid member 20 by a screw 28.

Figure 6:
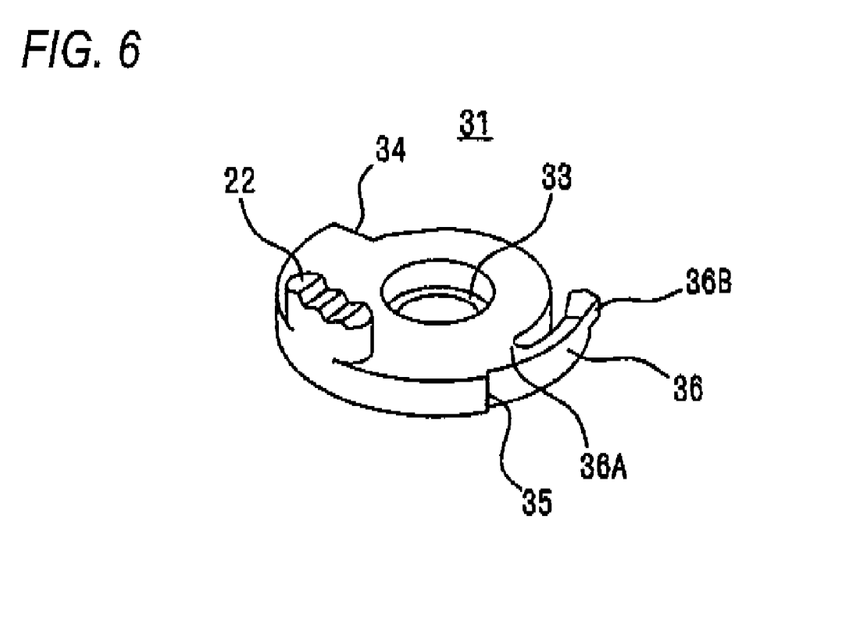
FIG. 6 is a perspective view of a rotary member constituting the lid member in the medical telemeter which is the first embodiment of the electronic apparatus of the invention.

As shown in FIG. 6, the operating portion 22 which is a small projection having a generally rectangular parallelepiped shape is formed on one face of the rotary member 31. The rotary member 31 is formed into a disk-like shape, and has a through hole 33 which is surrounded by a sleeve 32, in the middle of the disk. An outermost circumferential portion is continuous to a small-diameter circumferential portion through a large step portion 34 and a small step portion 35. The sleeve 32 is formed into a cylindrical shape, and has a flat portion 32A a part of which is cut away. The small-diameter circumferential portion which is continuous to the small step portion 35 forms the outline of an arm piece 36 which spirally elongates. The small-diameter circumferential portion which is continuous to the large step portion 34 elongates to a basal portion 36A of the arm piece 36. A projection portion 368 which is outward projected is formed in a tip end portion of the arm piece 36. The arm piece 36 has a flexibility in which the piece flexes outward and inward about the basal portion 36A.

A hole 41 into which a large-diameter portion that is below the engaging piece 26 is inserted is opened in a middle portion of the inner lid top plate 40. Holes are formed respectively in two places which are separated by a substantially same distance in the longitudinal direction from the hole 41. A volute spring 42 which is configured by an electrically conductive member that is in contact with the cathode of one of the batteries is projected through one of the holes, and a contact projection 43 which is in contact with the anode of the other battery is disposed in the other hole.

Figure 7:
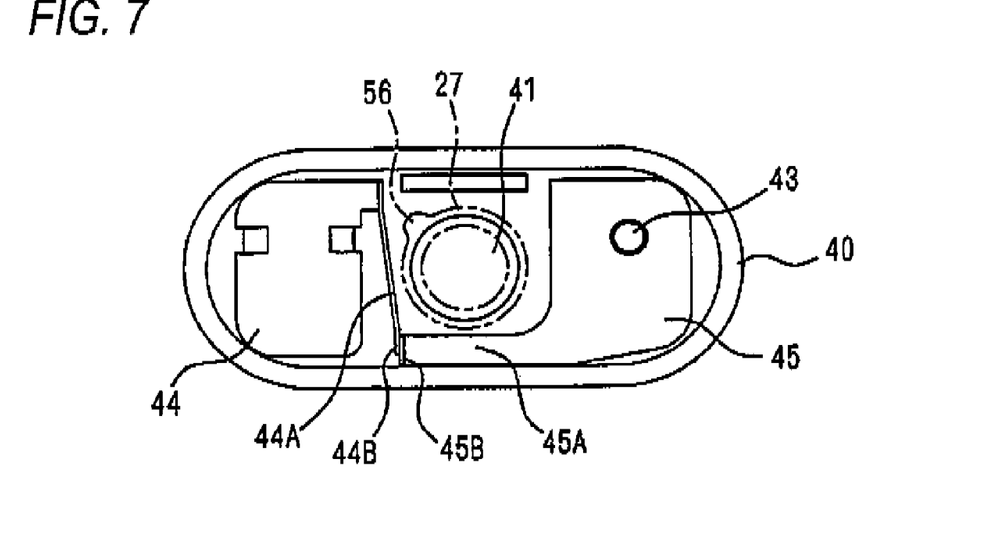
FIG. 7 is a plan view showing switch contacts in the lid member in the medical telemeter which is the first embodiment of the electronic apparatus of the invention.

As shown in FIG. 7, electric paths 44, 45 each of which is configured by an electrically conductive member are bonded to the rear face of the inner lid top plate 40. The electric path 44 is electrically connected to the volute spring 42. The contact projection 43 which is formed so as to be convex toward the side of the surface of the inner lid top plate 40 is disposed on the electric path 45. A flexible movable piece 44A which is bent from one corner of the electric path 44 to vertically erect with respect to the rear face of the inner lid top plate 40 is disposed so as to elongate in the width direction of the inner lid top plate 40. The electric path 45 has a small-width portion 45A which elongates toward a tip end portion of the flexible movable piece 44A. The tip end of the small-width portion is bent to vertically erect with respect to the rear face of the inner lid top plate 40, thereby forming a stationary switch contact 45B. The tip end portion of the flexible movable piece 94A is formed as a movable switch contact 44B which is opposed to the stationary switch contact 45B.

As shown in FIG. 5, a wall portion 51 which is to be fitted to a step portion in the periphery of the inner lid top plate 40 is formed on the inner lid bottom plate 25. A hole 52 through which the sleeve 32 of the rotary member 31 is inserted is formed in a middle portion of the inner lid bottom plate 25. A pedestal 53 that is projected in an annular shape a part of which is cut away is formed in the periphery of the hole 52. A convex wall 54 is formed in a portion which is about two thirds of the periphery of the pedestal 53.

Figure 8:
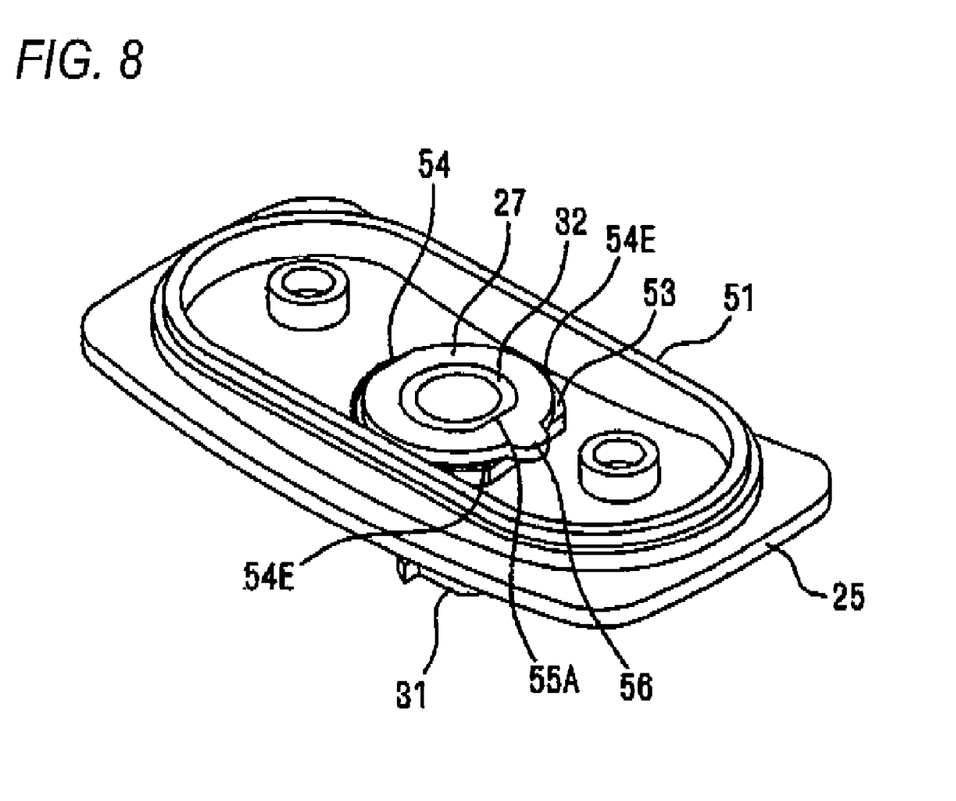
FIG. 8 is a perspective view of a state where a part of the lid member in the medical telemeter which is the first embodiment of the electronic apparatus of the invention are assembled together.

The ring 27 is placed on the pedestal 53. The ring 27 has a hole 55 through which the sleeve 32 of the rotary member 31 is inserted. The hole 55 has a basically circular shape, but a linear portion 55A corresponding to the flat portion 32A of the sleeve 32 is partly formed. In a state where the sleeve 32 of the rotary member 31 is inserted into the hole 55 of the ring 27, therefore, the sleeve 32 and the ring 27 are integrally fitted to each other as shown in FIG. 8. A configuration may be employed where, in this state, a finger is engaged with the operating portion 22 of the rotary member 31, and the operating portion 22 is slid in the groove 21 from the ON position to the OFT position, thereby causing the sleeve 32 and the ring 27 to be integrally swung.

The ring 27 is swung by the sliding movement of the operating portion 22. In the embodiment, the operating portion 22 is slidable within the range of the groove 21. Therefore, the ring 27 may be configured so as to be swingable within the range where the operating portion 22 is slidable.

The outer circumference of the ring 27 has a substantially circular shape. A projection piece 56 is formed which, in the state where the ring is fitted to the sleeve 32 and placed on the pedestal 53, is projected in the direction of an edge portion of the pedestal 53 where the convex wall 54 does not exist. The ring 27 and the projection piece 56 are integrally swung. Alternatively, both ends 54E of the convex wall 54 may function as a stopper, and the ring 27 may be swung within a range of the pedestal 53 where the convex wall 54 does not exist.

In a state where the rotary member 31, the inner lid bottom plate 25, and the ring 27 are assembled together, the inner lid top plate 40 is put on as shown in FIG. 8. When the operating portion 22 is positioned at the ON position in the groove 21 formed in the outer lid 24, the ring 27 is in the state indicated in FIG. 7 by dash-dot lines which are phantom lines, and the projection piece 56 is positioned in the vicinity of the base of the flexible movable piece 44A of the electric path 44. Therefore, the stationary switch contact 45B and the opposed movable switch contact 44B are in a state where the contacts are in contact with each other. When the operating portion 22 is swung toward the OFF position in the groove 21, the projection piece 56 is swung in a counterclockwise direction in FIG. 7 to push the flexible movable piece 44A toward the electric path 44, and hence the stationary switch contact 45B and the opposed movable switch contact 44B are separated from each other, with the result that the off state where the electric power is not supplied from the batteries to the electronic circuit is attained.

As shown in FIG. 5, a shaft 61 which is inward projected is formed on a middle portion of the inner bottom face of the outer lid 24. A head 61A of the shaft 61 has a rectangular prism-like shape which corresponds to a rectangular hole (not shown) that is formed in the bottom portion of the engaging piece 26. The rotary member 31 is disposed on the inner bottom face of the outer lid 24 in a state where the shaft 61 is inserted into the through hole 33 of the rotary member 31 as shown in FIGS. 9(a) and 9(b).

On the inner bottom face of the outer lid 24, a cylindrical guide wall 62 is disposed so as to extend along the outermost circumference of the rotary member 31 which is pivotally supported by the shaft 61. On the inner wall of the guide wall 62, assuming that a line segment elongating in the longitudinal direction vertically bisects the outer lid 24, projections 63, 64 which are inward projected are formed at two positions where the line segment intersects with the outer lid 24, respectively. The projection 63 functions as a stopper with respect to the large step portion 34 of the rotary member 31, and the projection 64 functions as a stopper with respect to the small step portion 35.

Figure 9:
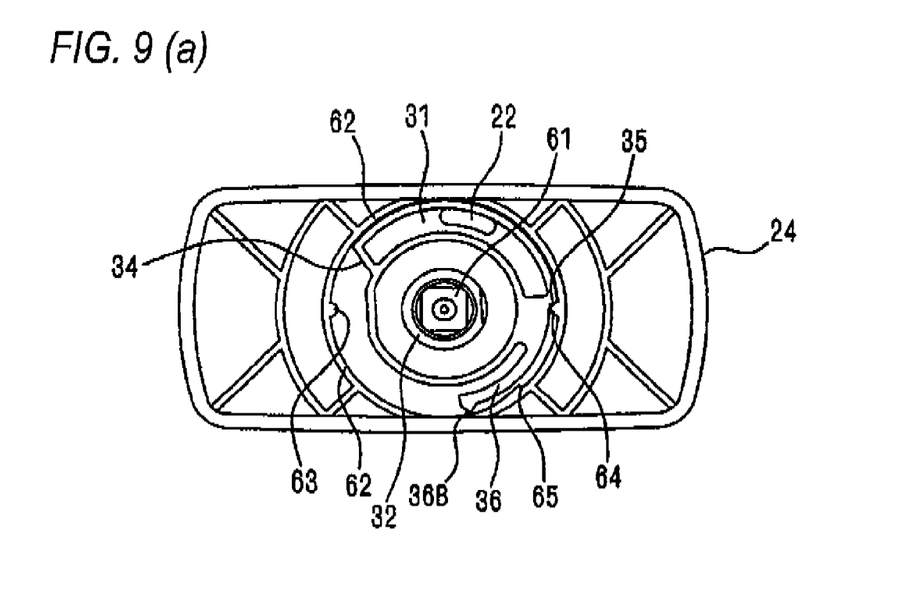
FIGS. 9(a) and 9(b) are plan views illustrating the operation of an operating portion of the lid member in the medical telemeter which is the first embodiment of the electronic apparatus of the invention.

In a portion where, in a state where the projection 63 butts against the large step portion 34 of the rotary member 31, the projection portion 36B of the arm piece 36 is positioned, a step 65 is formed on the inner wall of the guide wall 62 as shown in FIG. 9(b). In the step 65, the height is made higher as advancing in a clockwise direction. In the state where the projection 63 butts against the large step portion 34 of the rotary member 31 as shown in FIG. 9(b), the projection portion 36B of the arm piece 36 butts against the step 65, and the operating portion 22 is at the ON position in the groove 21. At this time, the projection piece 56 of the ring 27 which is fitted to the sleeve of the rotary member 31 is at a position where the stationary switch contact 45B and the opposed movable switch contact 44B are caused to be contacted with each other.

When, in this state, the operating portion 22 is swung toward the OFF position in the groove 21 (in a clockwise direction in FIGS. 9(a) and 9(b)), the arm piece 36 flexes, and the projection portion 36B advances so as to override the step 65 and slide on the inner wall of the guide wall 62. When the operating portion is further swung, the projection 64 butts against the small step portion 35 to function as a stopper. At this time, the operating portion 22 is at the OFF position in the groove 21 (FIG. 9(a)), and the projection piece 56 of the ring 27 which is fitted to the sleeve of the rotary member 31 is at a position where the stationary switch contact 45B and the opposed movable switch contact 44B are caused to be separated from each other.

In the state of FIG. 9(a), the coupling force (frictional force) between the inner wall of the guide wall 62 in the outer lid 24 and the outer circumference of the rotary member 31 is very weaker than that between the outer wall of the sleeve 32 of the rotary member 31 and the hole 52 in the inner lid bottom plate 25. In the case where the lid member 20 is to be removed in battery replacement, the outer lid 24 is swung with respect to the inner lid bottom plate 25 (see FIG. 3(b)), and the rotary member 31 is caused to follow the inner lid bottom plate 25 by the above-described difference between the coupling forces.

When the state of FIG. 9(b) is attained, by contrast, the coupling force (frictional force) between the outer wall of the sleeve 32 of the rotary member 31 and the hole 52 in the inner lid bottom plate 25 is not so large as to cause the projection portion 36B of the arm piece 36 to override the step 65, and hence the rotary member 31 remains in the state of FIG. 9(b). In the case where the positional relationship between the rotary member 31 and the outer lid 24 is in the state of FIG. 9(b), even when the outer lid 24 is swung in any direction with respect to the inner lid bottom plate 25, therefore, the positional relationship between the rotary member 31 and the outer lid 24 remains in the state of FIG. 9(b).

In the case where, before the lid member 20 is removed in battery replacement, the operating portion 22 is at the OFF position in the groove 21 (FIG. 9(a)), when the outer lid 24 is swung with respect to the inner lid bottom plate 25 (in a clockwise direction in FIGS. 9(a) and 9(b)), therefore, the rotary member 31 follows the inner lid bottom plate 25 to remain, the arm piece 36 is slid over the inner wall of the guide wall 62 so that the projection portion 36B of the arm piece 36 reaches the step 65, and the projection 63 butts against the large step portion 34 of the rotary member 31, thereby stopping the swinging operation. Even when, before the lid member 20 is removed in battery replacement, the operating portion 22 is at the OFF position in the groove 21, namely, the operating position 22 is moved to the ON position in the groove 21, and the state of FIG. 9(b) is attained.

In the case where, after battery replacement, the outer lid 24 is swung in the direction in which the outer lid 24 and the inner lid bottom plate 25 overlap with each other, the projection portion 36B of the arm piece 36 does not override the step, and the rotary member 31 is swung together with the outer lid 24 in a state where the rotary member remains in the position of FIG. 9(b), and the outer lid 24 and the inner lid bottom plate 25 overlap with each other. Therefore, the operating portion 22 is positioned at the ON position in the groove 21. In this way, the power source is turned ON, and the electronic circuit starts to operate.

By contrast, in the case where, before the lid member 20 is removed in battery replacement, the operating portion 22 is at the ON position in the groove 21 (FIG. 9(b)), even when the outer lid 24 is swung with respect to the inner lid bottom plate 25, the rotary member 31 is swung together with the outer lid 24 in the state where the rotary member remains in the position of FIG. 9(b). In the case where, before the lid member 20 is removed in battery replacement, the operating portion 22 is at the ON position in the groove 21, namely, the outer lid 24 is swung while being accompanied by the rotary member 31, in the state where the operating portion 22 is kept to be held to the ON position in the groove 21.

When, after battery replacement, the outer lid 24 is further swung in the direction in which the outer lid 24 and the inner lid bottom plate 25 overlap with each other, the rotary member 31 is swung together with the outer lid 24 in the state where the rotary member remains in the position of FIG. 9(b) in a similar manner as described above, and the outer lid 24 and the inner lid bottom plate 25 overlap with each other. Therefore, the power source is turned ON, and the electronic circuit starts to operate.

As described above, the outer lid 24, the inner lid bottom plate 25, and the rotary member 31, when the operating portion 22 is not at a predetermined one of the ON and OFF positions, moves the operating portion 22 to the predetermined position and holds it in accordance with the removal of the lid member 20 from the apparatus body 10. Although the predetermined position is the ON position in the embodiment, it is easy for those skilled in the art that the predetermined position is changed to the OFF position by modifying the configuration of the switch contacts.

Figure 10:
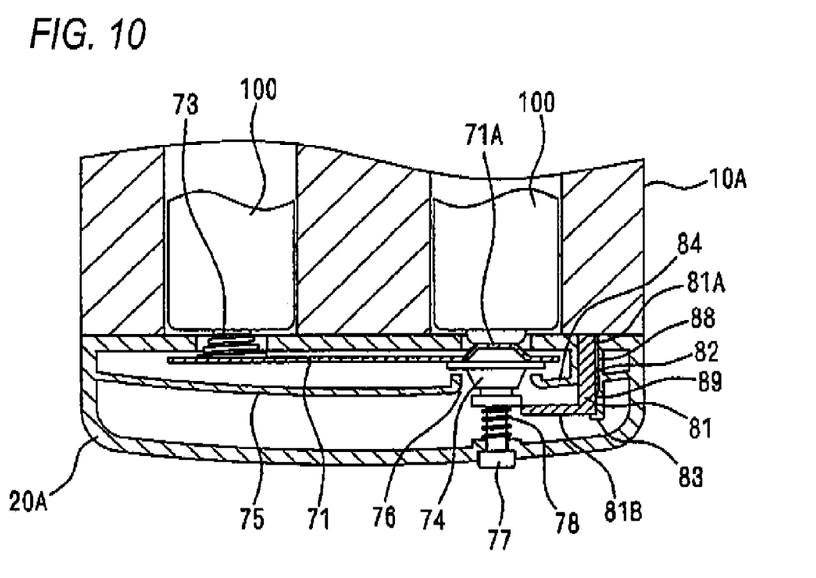
FIG. 10 is a sectional view showing an ON state in a medical telemeter which is a second embodiment of the electronic apparatus of the invention.
Figure 11:
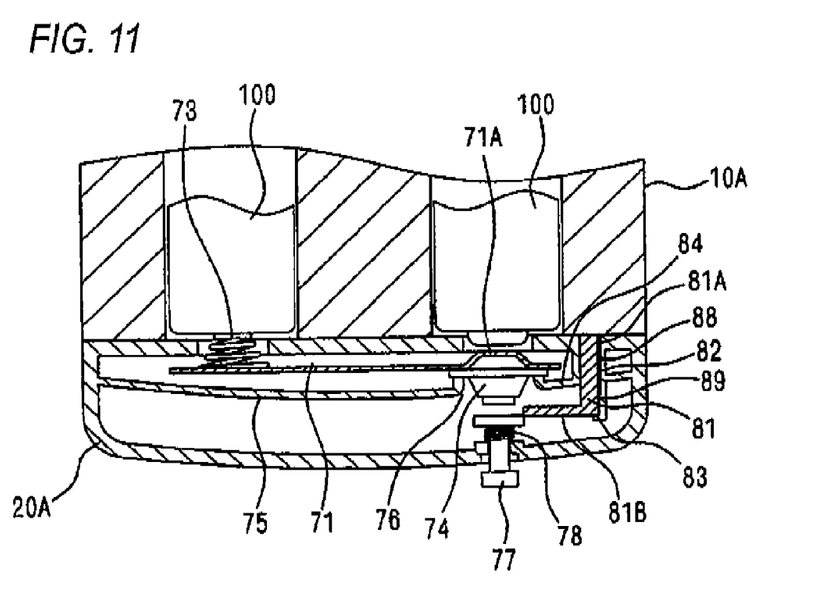
FIG. 11 is a sectional view showing an OFF state in the medical telemeter which is the second embodiment of the electronic apparatus of the invention.
Figure 12:
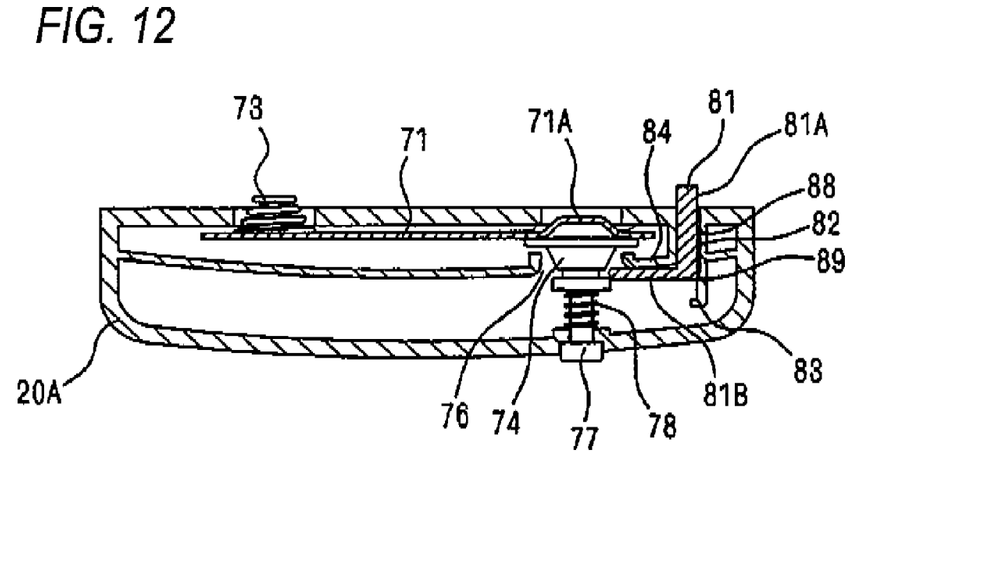
FIG. 12 is a sectional view of a lid member which is removed from the apparatus body in the medical telemeter which is the second embodiment of the electronic apparatus of the invention.

FIGS. 10 to 12 show the configuration of a part of an electronic apparatus of a second embodiment. The apparatus body 10A includes an electronic circuit, and electric power is supplied from batteries 100 to the electronic circuit. A lid member 20A is attachable to and detachable from the apparatus body 10A. The attaching/detaching configuration may be identical with that of the first embodiment, or alternatively may have an attaching/detaching structure due to a sliding or pulling/pushing operation.

The lid member 20A includes an electric path 71 configured by a plate-like electrically conductive member. A volute spring 73 configured by an electrically conductive member, and a projection 71A are disposed on the electric path 71. A cup-like pressing piece 74 is disposed immediately below the projection 71A. The pressing piece 74 is supported at the position of a hole 76 by a tip end portion of an intermediate top plate 75 which elongates from a side wall portion of the lid member 20A. A pressing pin 77 having upper and lower stoppers is attached to a hole in the bottom face of the lid member 20A which is below the pressing piece 74. A spring 78 is interposed between the upper stopper of the pressing pin 77 and the bottom face of the lid member 20A, to urge the pressing pin 77 toward the pressing piece 74.

An L-like rod member 81 is disposed in the side of the upper stopper of the pressing pin 77. In the rod member 81, a basal portion 81A is inserted into a through hole 82 which communicates with the top plate of the lid member 20A, and an arm portion 81B which is perpendicularly bent from the basal portion 81A is flexible. The rod member 81 is supported by a supporting portion 83 which is protruded below the through hole 82, and can be raised to the position of a stopper 84 which is extended above the arm portion 81B. A tip end portion of the arm portion 81B is in contact with the upper stopper of the pressing pin 77. When the pressing pin 77 is manually operated, the tip end portion can be moved upward or downward through the upper stopper of the pressing pin 77 because of the flexibility of the arm portion 81B, but is not caused to flex by the force of the spring 78. A slope 89 that includes a large-width portion 88 in which the width is increased, in the side remote from the stopper 84, and that is narrowed as downward advancing is formed in an upper portion of the through hole 82.

The projection 71A of the electric path 71 is in contact with or not in contact with the anode of one of the batteries, is disposed in the power supplying path, and functions as a switch contact for closing/opening the power supplying path. The electric path 71 is held so as to be vertically movable in the lid member 20A. The pressing pin 77 constitutes an operating portion which is moved between the ON position and the OFF position in order to move the switch contact, thereby closing/opening the power supplying path. The ON position is a position (FIG. 10) where the pressing pin 77 is pushed into the lid member 20A, and the OFF position is a position (FIG. 11) where the pressing pin 77 is pulled out from the lid member 20A.

In the above-described configuration, in a state where the batteries 100 are mounted and the lid member 20A and the apparatus body 10A are coupled to each other, when the pressing pin 77 is manually pushed into the lid member 20A, the upper stopper of the pressing pin 77 is moved to an upper portion while passing over the arm portion 81B, the pressing piece 74 is pressed by the urging force of the spring 78, and the projection 71A which exists above the piece is pushed up to be contacted with the anode of one of the batteries 100, thereby attaining the ON state (FIG. 10).

When the pressing pin 77 is manually pulled out from the lid member 20A in the ON state, the upper stopper of the pressing pin 77 causes the arm portion 81B to flex, and is further moved to a lower portion while passing over the arm portion, and a state where the upper stopper of the pressing piece 74 is pushed is by the tip end portion of the arm portion 81B is attained (FIG. 11). The pressing piece 74 does not receive the urging of the spring 78, and the projection 71A is downward moved, so that the OFF state where the projection is not in contact with the anode of the battery 100 is attained.

When, in order to perform battery replacement, the lid member 20A is removed in the ON state shown in FIG. 10, this state is maintained, and the ON state is held. When, after battery replacement, the lid member 20A is closed, the ON state shown in FIG. 10 is held.

When, in order to perform battery replacement, the lid member 20A is removed in the OFF state shown in FIG. 11, the pressing pin 77 receives the urging of the spring 78, and is upward moved. At this time, the upper stopper of the pressing pin 77 is moved in the state where the arm portion 81B, is placed on the stopper. Therefore, a part of the basal portion 81A of the rod member 81 is projected from the through hole 82, but blocked by the stopper 84 from being further raised (FIG. 12), and the rod member 81 is pushed out toward the large-width portion 88, slides down along the slope 89, and then supported by the supporting portion. The rod member 81 is returned to the position indicated in FIG. 10. In this state, the upper stopper of the pressing pin 77 upward presses the pressing piece 74 by means of the urging force of the spring 78, and the projection 71A which exists above the stopper is pushed up to be positioned to the position of the ON position where the projection can be contacted with the anode of the battery 100.

As described above, the pressing pin 77, the spring 78, the rod member 81, and the through hole 82, when the pressing pin 77 functioning as the operating portion is not at a predetermined one of the ON and OFF positions, moves the pressing pin 77 to the predetermined position and holds it in accordance with the removal of the lid member 20A from the apparatus body 10A. Also in the second embodiment, even when, before the lid member 20A is removed in battery replacement, the pressing pin 77 is at the OFF position, the pressing pin 77 is moved to the ON position.

Figure 13:
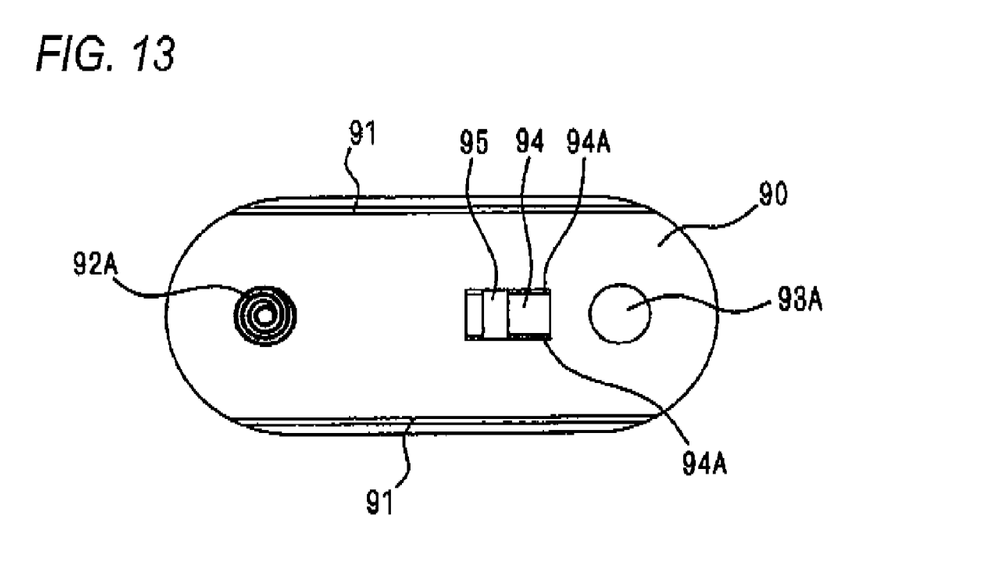
FIG. 13 is a plan view showing a part of a medical telemeter which is a third embodiment of the electronic apparatus of the invention.
Figure 14:
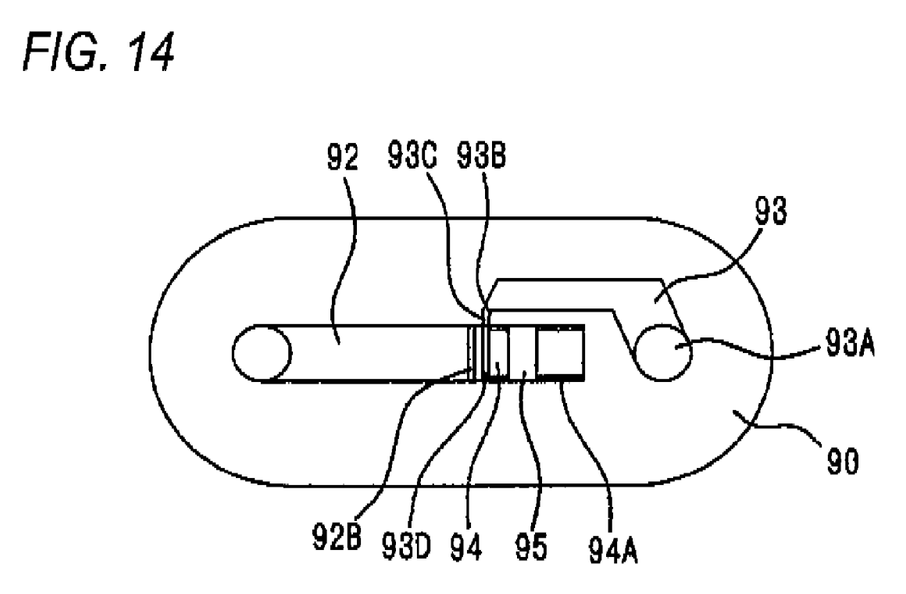
FIG. 14 is a plan view showing the rear face of FIG. 13.
Figure 15:
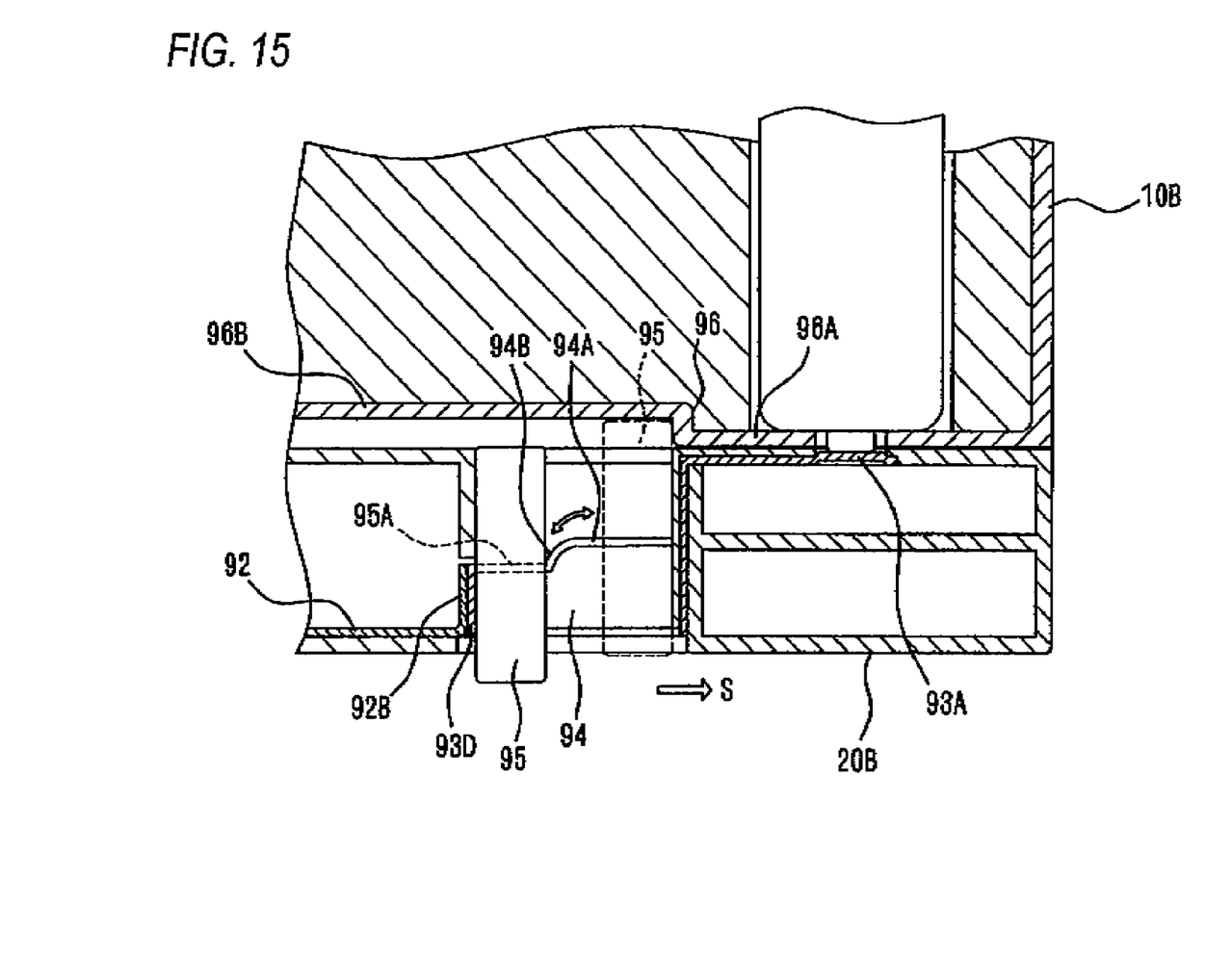
FIG. 15 is a sectional view of a part of the medical telemeter which is the third embodiment of the electronic apparatus of the invention.

FIGS. 13 to 15 show the configuration of a part of an electronic apparatus of a third embodiment. A sliding groove 91 along which a sliding wall is slid is formed in an inner top cover 90 of a lid member 20B shown in FIG. 13. The sliding wall is formed on a bottom portion of the apparatus body 10B which is similar to that of the first embodiment. The lid member 20B can slide to be removed. A volute spring 92A and a projection 93A are projected from the inner top cover 90 of the lid member 20B.

An electric path 92 to which the volute spring 92A is connected, and which is configured by an electrically conductive member, and an electric path 93 in which the projection 93A is formed, and which is configured by an electrically conductive member are disposed on the rear face of the inner top cover 90 of the lid member 20B shown FIG. 13.

In the inner top cover 90 of the lid member 20B, a long and narrow sliding hole 94 is opened in a portion which is slightly on the right side of a middle portion shown in FIG. 13. Sliding rails 94A are formed in the long sides of the sliding hole 94, respectively. An operating portion 95 having a rectangular parallelepiped shape is fitted into the sliding hole 94. End portions of the sliding rails 94A which are close to the electric path 92 constitute the ON position, and those of the sliding rails 94A which are opposite to the ON position in the longitudinal direction constitute the OFF position. A flexible piece 93C which is connected to a basal portion 93B of the electric path 93, and which is flexible elongates in the vicinity of the ON position. A tip end portion of the flexible piece is perpendicularly bent with respect to a flat face of the electric path 93 to be formed as a switch movable contact 93D. A switch stationary contact 92B which is opposed to the switch movable contact 93D, and which is perpendicularly bent with respect to a flat face of the electric path 92 is formed in the vicinity of the switch movable contact 93D.

In side walls of the operating portion 95, sliding grooves 95A are formed at positions corresponding to the sliding rails 94A in the sliding hole 94, respectively, so that the operating portion 95 can be slid between the ON position and the OFF position. When the operating portion 95 is positioned at the ON position, the portion presses the switch movable contact 93D against the opposed switch stationary contact 92B, and the power source ON state is attained.

As shown in FIG. 15, as laterally viewing the sliding hole 94, each of the sliding rails 94A has a step 94B in a portion which is slightly closer to the ON position with respect to a middle portion, so that the operating portion 95 sinks at a position which is close to the ON position, and is projected on the side which is close to the OFF position.

As shown in FIG. 15, in the bottom face of the apparatus body 10, a step 96 is formed at a position corresponding to the end of the sliding hole 94 on the side of the OFF position, and the portion which is on the outer side with respect to the step 96 is formed as a projection 96A which is projected toward the lid member 20B. In the bottom face of the apparatus body 10B, a portion which is on the side of the middle with respect to the step 96 is configured as a recess 96B which forms a gap with the lid member 20B. The dimension between the projection 96A and the recess 96B corresponds to the step differences of the steps 94B in the sliding rails 94A.

In the case where the lid member 20B is to be removed, when the lid member 20B is slid in the direction of the arrow S in FIG. 15, the sliding wall formed on the bottom portion of the apparatus body 10B is slid in the sliding groove 91 formed in the lid member 20B, so that the lid member 20B can be removed by means of the sliding operation. At this time, when the operating portion 95 is at the OFT position, the step 96 of the apparatus body 10B presses the head of the operating portion 95 to move the portion toward the ON position, and the operating portion 95 passes over the steps 94B in the sliding rails 94A to reach the ON position. In this state, the operating portion 95 sinks, and the step 96 of the apparatus body 10B does not press the head of the operating portion 95.

As described above, the sliding hole 94, the sliding rails 94A, and the steps 94B, when the operating portion 95 is not at a predetermined one of the ON and OFF positions, moves the operating portion 95 to the predetermined position and holds it in accordance with the removal of the lid member 20B from the apparatus body 10B. Also in the third embodiment, even when, before the lid member 20B is removed in battery replacement, the operating portion 95 is at the OFF position in the sliding hole 94, the operating portion 95 is moved to the ON position. When, after battery replacement, the lid member 20B is slid in the direction opposite to the arrow S in FIG. 15, the operating portion 95 is positioned at the ON position without any influence, and presses the switch movable contact 93D against to the opposed switch stationary contact 92B, thereby attaining the power source ON state.

According to an aspect of the invention, when the lid member is removed, the operating portion is moved to the predetermined position and held at the predetermined position, so that the power source is turned ON or OFF after replacement of the battery. Therefore, a cumbersome operation is not necessary, and, even when the operator forgets to perform an operation of turning ON or OFF the power source, the power source is set to a predetermined state. Consequently, the work efficiency is improved. In the case where the predetermined state is the ON state, moreover, it is possible to avoid a situation where the measurement is disabled by human error that, after replacement of the battery, the operator forgets to turning ON or OFF the power source of the electronic apparatus.

According to an aspect of the invention, even in the case where the lid member is coupled to the apparatus body, when the lid member is removed, therefore, the state where the operating portion is moved to the predetermined position remains, and hence the power source is assured to be turned ON or OFF after replacement of the battery.

According to an aspect of the invention, in the case where the lid member is removed by a swinging or sliding operation, the state where the operating portion is moved to the predetermined position remains, and the power source is assured to be turned ON or OFF after replacement of the battery.

What is claimed is:

1. An electronic apparatus comprising:
   an apparatus body configured to house a battery;
   a lid member which is coupled to the apparatus body;
   an operating portion which is moved between an ON position where a power source supplied from the battery is turned ON, and an OFF position where the power source is turned OFF; and
   a unit which, when the operating portion is not at a position which is one of the ON position and the OFF position, moves the operating portion to the position that allows the lid cover to be removed or coupled to the apparatus body.

2. The electronic apparatus according to claim 1, further comprising:
   a switch contact which is disposed in a supply path for the power source, and which closes and opens the supply path, wherein the operating portion is moved between the ON position and the OFF position to move the switch contact, thereby closing or opening the supply path.

3. The electronic apparatus according to claim 1, wherein the unit continues to hold an operating position of the operating portion irrespective of an operation of coupling the lid member to the apparatus body.

4. The electronic apparatus according to claim 1, wherein the position is the ON position.

5. The electronic apparatus according to claim 1, wherein the lid member is removed from or coupled to the apparatus body by a swinging or sliding operation.

6. The electronic apparatus according to claim 1, wherein the operating portion is moved between the ON position and the OFF position along an arcuate groove.

7. The electronic apparatus according to claim 1, wherein the operating portion is moved from the OFF position to the ON position by being pressed toward the lid member.

8. The electronic apparatus according to claim 1, wherein the operating portion is disposed in the lid member.

9. The electronic apparatus according to claim 1, further comprising: a biological signal measuring portion which can measure a biological signal.

10. An electronic apparatus comprising:
    an apparatus body which can house a battery;
    a lid member which is removably coupled to the apparatus body;
    an operating portion which is moved between an ON position where a power source supplied from the battery is turned ON, and an OFF position where the power source is turned OFF; and
    a unit which, when the operating portion is at a first position which is one of the ON position and the OFF position, allows the operating portion to move to a second position which is the other of the ON position and the OFF position and holds the operating portion at the second position that allows the lid cover to be removed or coupled to the apparatus body.

* * * * *